L. R. McGUIRE.
RUBBER CONVEYING AND SOAPSTONING APPARATUS.
APPLICATION FILED MAY 31, 1919.
1,369,932. Patented Mar. 1, 1921.
2 SHEETS—SHEET 1.
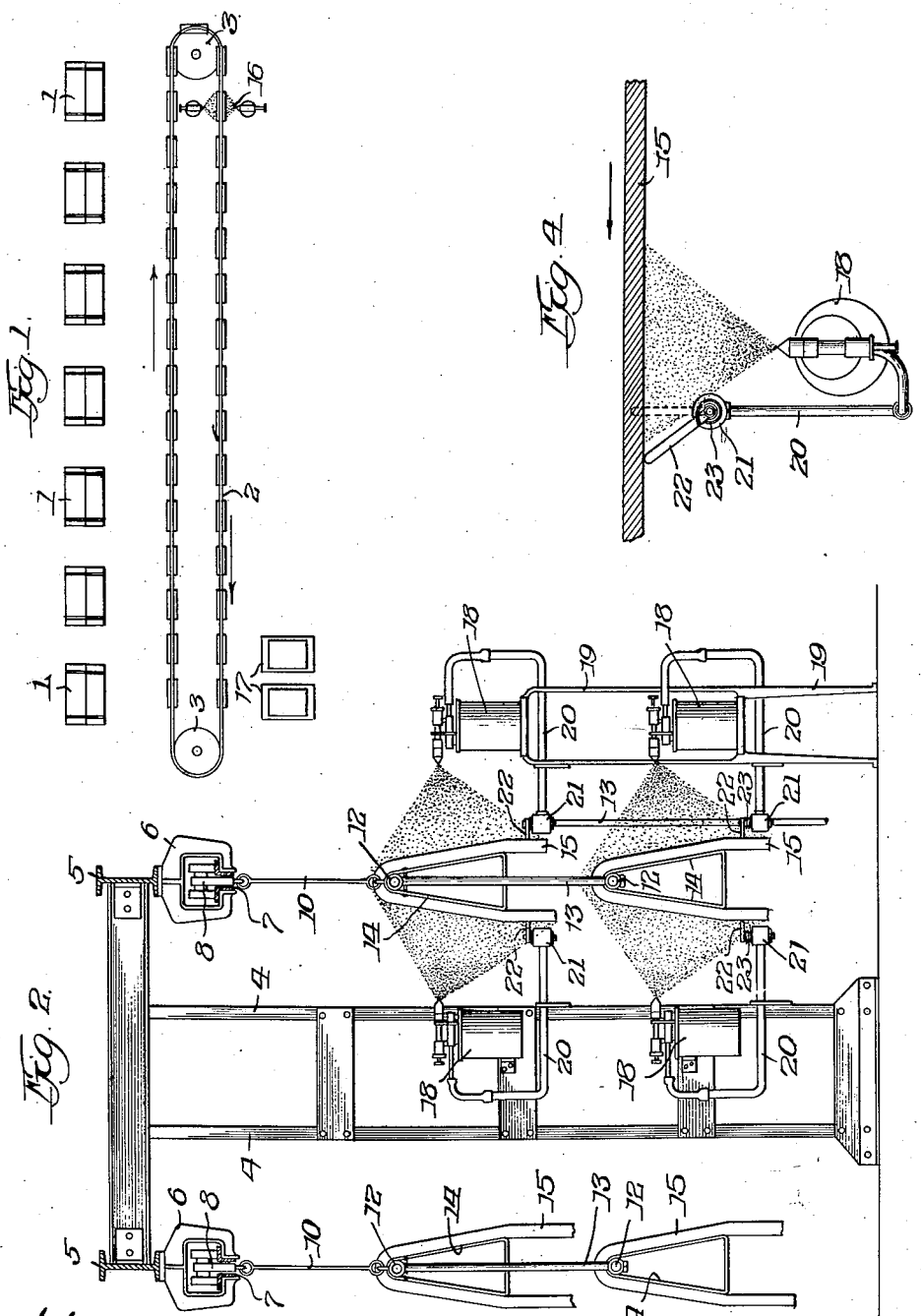

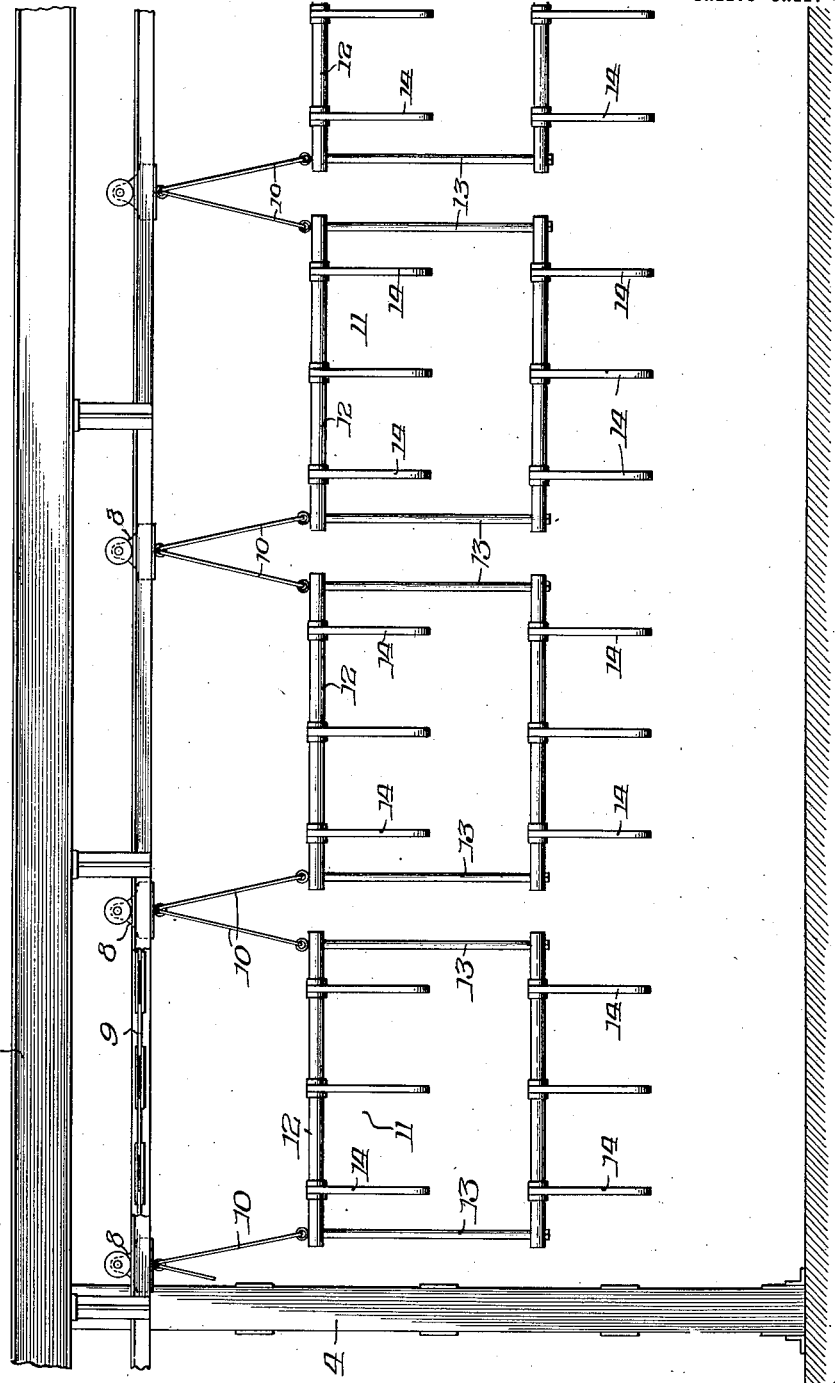

UNITED STATES PATENT OFFICE.

LEE R. McGUIRE, OF AKRON, OHIO, ASSIGNOR TO THE FIRESTONE TIRE AND RUBBER COMPANY, OF AKRON, OHIO, A CORPORATION OF OHIO.

RUBBER CONVEYING AND SOAPSTONING APPARATUS.

1,369,932.   Specification of Letters Patent.   Patented Mar. 1, 1921.

Application filed May 31, 1919. Serial No. 301,015.

*To all whom it may concern:*

Be it known that I, LEE R. McGUIRE, a citizen of the United States, residing at Akron, in the county of Summit, State of Ohio, have invented certain new and useful Improvements in Rubber Conveying and Soapstoning Apparatus, of which the following is a specification.

This invention relates to an apparatus for use in rubber factories and has for its object the efficient and economical handling, cooling and soapstoning of rubber after it is milled. In rubber factories, as operated at the present time, a great deal of free soapstone is always present in the air of the mill room, and forms one of the most objectionable features in a rubber factory. The present practice is to sheet the rubber and place it on long racks or stands on which it is dusted over with powdered soapstone and allowed to cool. It is the object of this invention to eliminate this soapstoning at the mills and to convey the sheeted rubber from the mills to or past a central station where all the soapstoning is done. This eliminates the powdered soapstone from the air of the mill room and concentrates the objectionable soapstoning operation at one point.

Other objects and advantages will be apparent as the description proceeds and it will be understood that changes and modifications may be made in form and proportion without departing from the spirit of the invention.

In the drawings:

Figure 1 is a plan view of a mill room showing the arrangement of the mills and the conveyer and soapstoning apparatus.

Fig. 2 is an end view of the conveyer and soapstoning apparatus.

Fig. 3 is a side elevation of the conveyer.

Fig. 4 is a detail view showing one method of controlling the soapstoning apparatus.

The invention contained herein is susceptible of many modifications and variations, but that shown in the drawings will afford an adequate conception thereof.

1 represents a mill, such as used for compounding and sheeting rubber and may be of any preferred type. When the stock on the mill has been run for the proper length of time, it is removed from the mill in sheets. In former practice in rubber shops, it was customary to lay the sheets of rubber on a rack or stand and then dust them over with powdered soapstone. In this invention the rubber as it is removed from the several mills, is conveyed to one point where all of the soapstoning is done. This confines the work to one location in the mill room and avoids excessive dust.

The conveyer is indicated generally by the numeral 2 and extends along the line of the mills passing around pulleys or sheaves 3 in the direction of the arrow in Fig. 1. The conveyer comprises a plurality of uprights or standards 4 carrying a horizontal framework 5 from which is suspended a plurality of brackets 6. These brackets support parallel rails 7, on which run a plurality of carriages 8 connected by chains 9, which pass over the pulleys.

From the carriages are suspended links or rods 10 which carry rectangular shaped frames 11 composed of horizontal rods 12 and vertical rods 13. On the rods 12 are carried a plurality of triangular spreaders or separators 14.

When the massed or sheeted rubber is removed from the mills, it is hung upon one of the horizontal rods 12, the members 14 serving to keep the sides from contact. Sheets of rubber are shown on the drawings and indicated by the numeral 15.

The conveyer brings the sheets of rubber past a soapstoning apparatus. This apparatus may be of any preferred type and is indicated by the numeral 16. It may be preferred to use dry soapstone powder, in which case the form of soapstoning apparatus will be different from that shown, or it may be desirable to use a soapstone solution, in which case the powder may be sprayed on by an air brush of any preferred type. When a liquid spray is used, it is advisable that the liquid be applied while the sheets are hot so that they will have an opportunity to dry while cooling and before piling on the skids or tables or placing in storage.

As one form of my invention, there is utilized a plurality of air brushes 18 supported on stands 19 at both sides of the conveyer, being provided with suitable air line connections 20. In the connection for each air brush there may be arranged a valve 21 which controls the spray and which is provided with an operating lever 22, held in closed position by a light coil spring 23, extending into the path of the slab of sheeted rubber. When the conveyer, loaded with rubber, is passing the air brushes, the air brushes are automatically operated to spray soapstone on the sheet. When the slab passes and when there is no rubber on the conveyor, the spray is closed and the soapstone is not wasted. This action is shown in Fig. 4.

While it may be desirable to use an automatic control for the spraying apparatus, this is not esential to my invention, as the spraying may be manually controlled, or it may be operated in any approved manner.

After the rubber is soapstoned, it is carried to a point where it is removed and piled on skids or racks 17, being given time to dry and cool on the way to the skids.

The description contained herein is only one form of my invention, it being obvious that many changes and modifications are possible within the scope of the invention and are intended to be covered herein.

I claim:

1. In an apparatus of the character described the combination of a plurality of mills, a conveyer adjacent the mills, supports on the conveyer for sheeted rubber and a soapstoning station at the side of the conveyer.

2. In an apparatus of the character described, the combination of a plurality of mills, a conveyer adjacent the mills, supports on the conveyer for sheeted rubber and a soapstoning device at the side of the conveyer operated when rubber is brought past the device on the conveyer.

3. In an apparatus of the character described, the combination of a plurality of mills for compounding and sheeting rubber, a conveyer adjacent the mills receiving the compounded and sheeted rubber therefrom, a soapstoning apparatus at the side of said conveyer, the conveyer being of a length sufficient to allow the compound rubber to cool before it is removed.

4. In an apparatus of the character described, the combination of a plurality of mills for compounding and sheeting rubber, a conveyer adjacent the mills receiving the compounded and sheeted rubber therefrom, and a soapstoning apparatus located adjacent the conveyer.

5. In an apparatus of the character described, the combination of a plurality of mills for compounding and sheeting rubber, a conveyer adjacent the mills receiving the compounded and sheeted rubber therefrom, and a soapstoning apparatus located adjacent the conveyer controlled by the movement of said conveyer.

6. In an apparatus of the character described, the combination of a plurality of mills for compounding and sheeting rubber, a conveyer adjacent the mills for receiving the compounded and sheeted rubber therefrom, and a soapstoning station located adjacent the conveyer, the said conveyer being of a length sufficient to allow the rubber to cool before being removed.

7. In an apparatus of the character described, the combination of a plurality of mills for compounding and sheeting rubber, a conveyer adjacent the mills for receiving the compounded and sheeted rubber therefrom, and a soapstoning apparatus located adjacent the conveyer and controlled thereby, the said conveyer being of a length sufficient to allow the rubber to cool before being removed.

8. An apparatus for cooling and soapstoning rubber comprising a conveyer, a support on said conveyer to receive the sheeted rubber, and an apparatus for distributing soapstone over the rubber on the conveyer, said soapstoning apparatus being controlled by the movement of the rubber on the conveyer.

9. An apparatus for handling rubber, comprising a conveyer, a support on said conveyer to receive sheeted rubber, and an apparatus controlled by the conveyer for distributing soapstone over the rubber on the conveyer, the said conveyer being of a length sufficient to allow the rubber to cool thereon.

10. An apparatus for handling rubber, comprising a conveyer, a support on said conveyer to receive sheeted rubber, and an air brush for spraying soapstone over the rubber on the conveyer, the said conveyer being of a length to allow the rubber to cool and dry thereon.

11. An apparatus for handling rubber, comprising a conveyer, a support on said conveyer to receive sheeted rubber and an air brush for spraying soapstone over the rubber on the conveyer, said air brush being operated by movement of the conveyer.

12. An apparatus for handling rubber, comprising a conveyer, a support on said conveyer to receive sheeted rubber and an air brush for spraying soapstone over the rubber on the conveyer, said conveyer being of a length to allow the rubber to cool and dry thereon, and said air brush being operated by the rubber on the conveyer.

LEE R. McGUIRE.